US010159172B2

(12) United States Patent
St. Romain et al.

(10) Patent No.: US 10,159,172 B2
(45) Date of Patent: *Dec. 25, 2018

(54) TINE HOLDING APPARATUS AND METHOD FOR AERATING SOIL

(71) Applicant: Textron Inc., Providence, RI (US)

(72) Inventors: Thomas E. St. Romain, Lake Charles, LA (US); Ernest Randall New, Mer Rouge, LA (US)

(73) Assignee: Textron Innovations Inc., Providence, RI (US)

( * ) Notice: Subject to any disclaimer, the term of this patent is extended or adjusted under 35 U.S.C. 154(b) by 159 days.

This patent is subject to a terminal disclaimer.

(21) Appl. No.: 15/336,855

(22) Filed: Oct. 28, 2016

(65) Prior Publication Data

US 2017/0042080 A1 Feb. 16, 2017

Related U.S. Application Data

(63) Continuation of application No. 14/216,106, filed on Mar. 17, 2014, now Pat. No. 9,485,898.

(60) Provisional application No. 61/852,229, filed on Mar. 15, 2013, provisional application No. 61/852,230, filed on Mar. 15, 2013.

(51) Int. Cl.
*A01B 45/02* (2006.01)
*A01B 76/00* (2006.01)

(52) U.S. Cl.
CPC ............ *A01B 45/023* (2013.01); *A01B 76/00* (2013.01)

(58) Field of Classification Search
CPC ....... A01B 45/00; A01B 45/02; A01B 45/023; A01B 76/00
See application file for complete search history.

(56) References Cited

U.S. PATENT DOCUMENTS

| 2,067,781 A | 1/1937 | Mueller |
| 2,068,828 A | 1/1937 | Tustain |
| 2,255,040 A | 9/1941 | Helbig |
| 2,347,748 A | 5/1944 | Melling |
| 2,728,283 A | 12/1955 | Oswalt |
| 2,730,028 A | 1/1956 | Oswalt |
| 3,136,274 A | 6/1964 | Townsend |

(Continued)

FOREIGN PATENT DOCUMENTS

DE 3041666 A1 6/1982

OTHER PUBLICATIONS

PCT Search Report, PCT/US/2014/030459, dated Aug. 12, 2014.

*Primary Examiner* — Jamie L McGowan
(74) *Attorney, Agent, or Firm* — Sandberg Phoenix & von Gontard P.C.

(57) ABSTRACT

An apparatus for retaining soil aerating tines during soil aerating operations comprising a tine holding assembly having a plurality of holes therein, wherein each hole is adapted to hold a soil aerating tine therein, wherein the holes are arranged in a plurality of rows of holes, wherein a plurality of spaces separate adjacent rows of holes, wherein the holes of at least one row of holes are positioned between the holes of at least one other row of holes. The apparatus can have at least one space that is at least twice as wide as at least one other space. The apparatus can further comprise a plurality of tine holding members, wherein each tine holding member comprises at least one row of holes of the plurality of rows of holes. Tines can be inserted into the holes to form a zigzag pattern.

14 Claims, 3 Drawing Sheets

(56) References Cited

U.S. PATENT DOCUMENTS

| | | |
|---|---|---|
| 3,429,378 A | 2/1969 | Mascaro |
| 3,490,540 A | 1/1970 | West et al. |
| 3,499,494 A | 3/1970 | Gijzenberg |
| 3,881,553 A | 5/1975 | Angeski |
| 4,476,938 A | 10/1984 | McKay |
| 4,511,004 A | 4/1985 | Deneen |
| 4,753,298 A | 6/1988 | Hansen et al. |
| 5,152,348 A | 10/1992 | Flanagan, Sr. et al. |
| 5,270,278 A | 12/1993 | Misra et al. |
| 5,709,273 A | 1/1998 | Roth |
| 5,803,181 A | 9/1998 | Hsu |
| 6,041,869 A | 3/2000 | Lewis et al. |
| 6,223,456 B1 | 5/2001 | Hawkins |
| 6,865,827 B2 | 3/2005 | Smith et al. |
| 3,056,646 A1 | 11/2011 | Broadstone |
| 8,714,275 B1* | 5/2014 | Ng |
| 9,485,898 B2* | 11/2016 | St Romain ............ A01B 76/00 |
| 2005/0006110 A1 | 1/2005 | Wessel |

\* cited by examiner

TINE HOLDING APPARATUS AND METHOD FOR AERATING SOIL

CROSS-REFERENCE TO RELATED APPLICATIONS

This application is a /continuation of U.S. patent application Ser. No. 14/216,106 filed on Mar. 17, 2014, which claims priority to U.S. provisional patent application 61/852,229, filed on Mar. 15, 2013, and the U.S. provisional patent application having the Ser. No. 61/852,230, filed on Mar. 15, 2013. The disclosures of the above applications are incorporated herein by reference in their entirety.

FIELD

The present invention relates to an apparatus for holding tines in connection with a soil aerating apparatus and to a method of aerating soil.

BACKGROUND

Grounds covered by lawn or turf, especially those forming part of parks or sports facilities, such as golf courses, football fields, or racecourses, require special care and attention to ensure the correct distribution of grass cover and compactness of the soil. Specifically, the soil surface must be uniformly covered by turf and loose enough to allow good drainage, while at the same time remain compact enough for easy treading or to allow sports to be played thereon.

In lawn or turf areas, particularly those that experience sustained vehicular and pedestrian traffic, the turf surface and underlying soil can become undesirably compacted. The problems associated with soil compaction are that rain and fertilizing chemicals are prevented from fully penetrating the soil, which causes the turf area to remain soggy for longer periods after a rain and inhibits a deep and healthy grass root system and proper grass growth. Therefore, it is necessary to sufficiently loosen up the soil to allow efficient drainage and to allow nutrients to penetrate to the root system, which enhance the cultivation of grass.

Soil or turf aeration is the process of creating channels in the soil so that water, air, and fertilizers can penetrate the ground and be dispersed effectively throughout the soil. Such treatment of the soil can be carried out using appropriate implements or machines which make holes in the soil in order to confer the properties described above.

A number of soil aerating devices exist to try to solve the above problems. These devices may be self-propelled or linked to the power take-off (PTO) of a tractor and may be equipped with means for vertically articulating a plurality of aerating pins or spikes, typically referred to as tines. The holes can be made in a succession of steps comprising driving a mechanism having a plurality of arms (i.e., tine heads or tine holders), which can comprise a plurality of tines connected at the bottom end thereof, which are repeatedly inserted into and out of the ground (e.g., cycled or reciprocated) while the soil aerating device moves along the surface of the soil, which is typically covered by grass or turf.

However, prior art soil aerating devices incorporate aerating techniques that are too slow. For example, prior art tine heads typically contain a single row of tines extending downwardly therefrom. In order to form a tight or a closely spaced hole pattern, the soil aerator must cycle the tine head very quickly, resulting in the soil aerators experiencing high rates of wear-and-tear and high breakdown rates, resulting in frequent down time for repair.

Other soil aerators, which cycle at slower rates, must in turn, move across the turf surface at a slower rate, resulting in a slower coverage rate. In order to speed up the soil aerating process, some soil aerating devices use tine heads containing two or more rows of tines, which are generally referred to as "cluster blocks." During operations, all of the tines in a cluster block are stamped or inserted into the soil in sequence, adjacent to (e.g., in front of) the previous set of holes created during the previous cycle of the tine head. In order to create a tight or a closely spaced hole pattern while using a cluster block, the tines that are held within the cluster block must also be tight or closely spaced. However, certain tine heads, especially cluster blocks, have too many tines within a small amount of space and can break off and/or lift sections of the turf upon entry and/or exit. To minimize such turf damage, the use of turf hold down guards are typically required.

A need exists for a tine head comprising multiple rows of tines for faster rate of coverage, wherein the tines do not damage the turf. A need exists for a tine head comprising multiple rows of tines that does not require the use of a turf guard. A need exists for a tine head comprising multiple rows of tines to form a tight or a closely spaced hole pattern in a turf without damaging the turf. Furthermore, a need exists for a method of performing soil aerating operations using a tine head comprising multiple rows of tines without damaging the turf. Lastly, a need exists for a method of forming a tight or a closely spaced hole pattern in the soil using a tine head comprising multiple rows of tines without breaking off and/or lifting sections of the turf upon entry into the soil and/or exit from the soil.

Embodiments usable within the scope of the present disclosure meet these needs.

SUMMARY

The present disclosure is directed to an apparatus for retaining soil aerating tines during soil aerating operations. The apparatus comprises a tine holding assembly having a plurality of holes therein. Each hole can be adapted to hold a soil aerating tine therein, wherein the holes can be arranged in a plurality of rows of holes, wherein a plurality of spaces can separate adjacent rows of holes, and wherein the holes of at least one row of holes can be positioned between the holes of at least one other row of holes. In an embodiment, the at least one space can be at least twice as wide as at least one other space. In an embodiment, the tine holding assembly comprises a centrally located space, wherein the centrally located space is at least twice as wide as another space.

The present disclosure is further directed to a tine head assembly for retaining soil aerating tines during soil aerating operations. The tine head assembly can comprise a frame adapted for connection to a soil aerating device and a plurality of tine holding members connected to the frame, wherein each tine holding member can comprise a plurality of cavities therein along the length of each tine holding member, and wherein the cavities of at least one tine holding member can be positioned between the cavities of at least one other tine holding member. In an embodiment of the tine head assembly, the cavities of each tine holding member can be separated from the cavities of each adjacent tine holding member by a plurality of spaces, wherein at least one space of the plurality of spaces can be at least twice as wide as another space of the plurality of spaces.

The present disclosure is further directed to a method of aerating soil. The method comprises the steps of moving a soil aerating machine along the soil in a forward direction, inserting a first row of tines into the soil to make a first plurality of holes in the soil and simultaneously inserting a second row of tines into the soil to make a second plurality of holes in the soil, wherein the holes of the first plurality of holes are between the holes of the second plurality of holes. The method steps can further comprise removing the first row of tines and the second row of tines from the soil, inserting the first row of tines into the soil to make a third plurality of holes in the soil, and simultaneously inserting the second row of tines into the soil to make a fourth plurality of holes in the soil, wherein the holes of the fourth plurality of holes are positioned between the holes of the first plurality of holes.

The foregoing is intended to give a general idea of the invention, and is not intended to fully define nor limit the invention. The invention will be more fully understood and better appreciated by reference to the following description and drawings.

DRAWINGS

In the detailed description of various embodiments usable within the scope of the present disclosure, presented below, reference is made to the accompanying drawings, in which.

One or more embodiments are described below with reference to the listed Figures.

DETAILED DESCRIPTION

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and nonlimiting.

Figure 1:
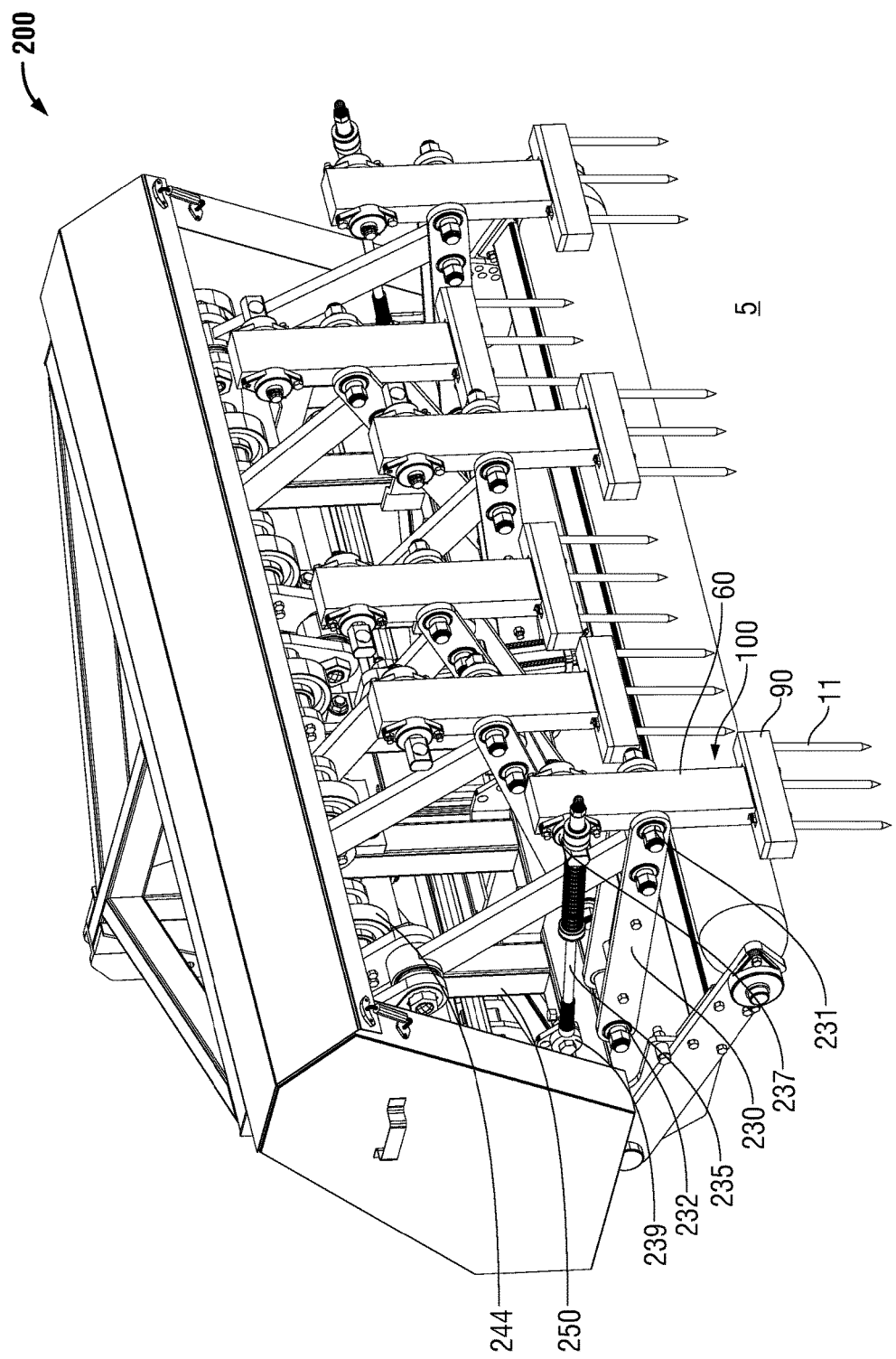
FIG. 1 depicts a perspective view of an embodiment of a soil aerating apparatus in accordance with the present disclosure.

Referring now to FIG. 1, depicting a perspective view of a soil aerating apparatus, referred to as a soil aerator (200), in accordance with the present disclosure. More particularly, Figure I depicts a tine holding assembly, referred to as a tine head (100), comprising a support arm (60) connected to a tine attachment block (90), which is adapted to support one or more tines (11). The support arm (60) is shown pivotally attached to the first end of the lower linkage arm (230) (i.e., second linkage arm) at a lower head pivot (231), located on the support arm (60). FIG. 1 further depicts the support arm (60) pivotally attached to the first end of the upper linkage arm (235) (i.e., first linkage arm) at an upper head pivot (237) located on the upper portion the support arm (60). The upper head pivot (237) can allow the upper linkage arm (235) to slide therethrough, allowing relative linear motion, in addition to pivoting motion, between the upper linkage arm (235) and the support arm (60).

FIG. 1 further depicts a soil aerator frame (250), which forms the support for the various components of the soil aerator (200). The second end of the lower linkage arm (230), opposite the first end, is shown connected to the lower rear portion of the frame (250) at the lower frame pivot (232). The second end of the upper linkage arm (235), opposite the first end, is shown connected to the rear portion of the frame (250) at the upper frame pivot (239), located above the lower frame pivot (232). Please note that the soil aerator (200), in FIG. 1, is not depicted with additional upper linkage arms connected between the frame (250) and the additional tine heads, for clarity purposes.

The depicted relative positioning or connection between the support arm (60), the upper linkage arm (235), the lower linkage arm (230), and portions of the frame (250), are configured to maintain the support arm (60) in an essentially constant orientation, which can be set or adjusted to be essentially perpendicular to the soil (5) at all times throughout the entire soil aerator (200) cycle of operation. The cycle of operation of the soil aerator (200) comprises a full rotation of a crankshaft (244) and the resulting up and down motion of the support arm (60).

Figure 2:
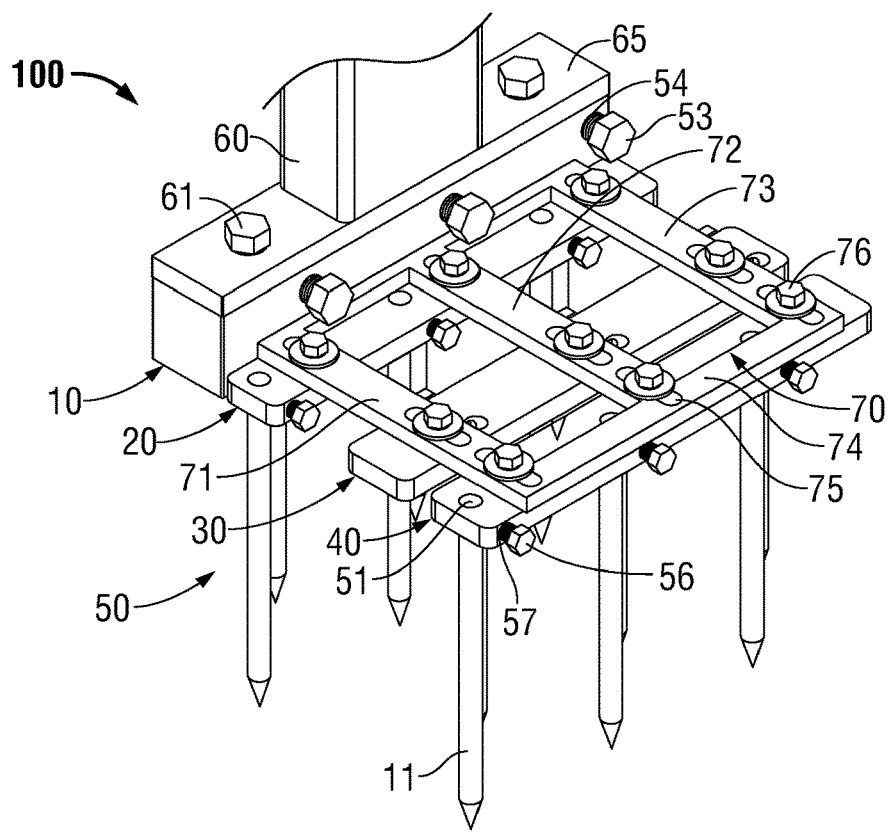
FIG. 2 depicts a perspective view of an embodiment of a tine head assembly in accordance with the present disclosure.

Referring now to FIG. 2, showing a perspective view of an embodiment of a tine head (100), in accordance with the present disclosure. The depicted tine head (100) configuration can allow multiple aeration tasks to be performed with one soil aerator (200, see FIG. 1) by using the tine head (100) of the present disclosure.

A typical prior art deep spike soil aerator uses a tine head comprising a single tine attachment member, which can hold a plurality of tines positioned in line. However, the tine head (100) depicted in FIG. 2 includes four rows of tines (11), with each row of tines connected to a separate tine holding member (10, 20, 30, 40), which form a tine attachment assembly (50). Specifically, the tine attachment assembly (50) is depicted comprising a first tine holding member (10) depicted as an elongated block. The attachment assembly (50) is further depicted comprising second, third, and fourth tine holding members (20, 30, 40) depicted as elongated bars, which are collectively referred to as secondary tine holding members (20, 30, 40). The tine head is shown further comprising a tine support arm (60), which is connected to the upper and lower linkage arms (235, 230) of the soil aerator (200) for actuating or reciprocating the tine head (100) as described above and shown in FIG. 1. The support arm (60) can comprise a lateral mounting bar (65) connected at the bottom of the support arm (60), wherein the lateral mounting bar (65) can be removably connected to the first holding member (10) by a plurality of bolts (61).

Figure 3:
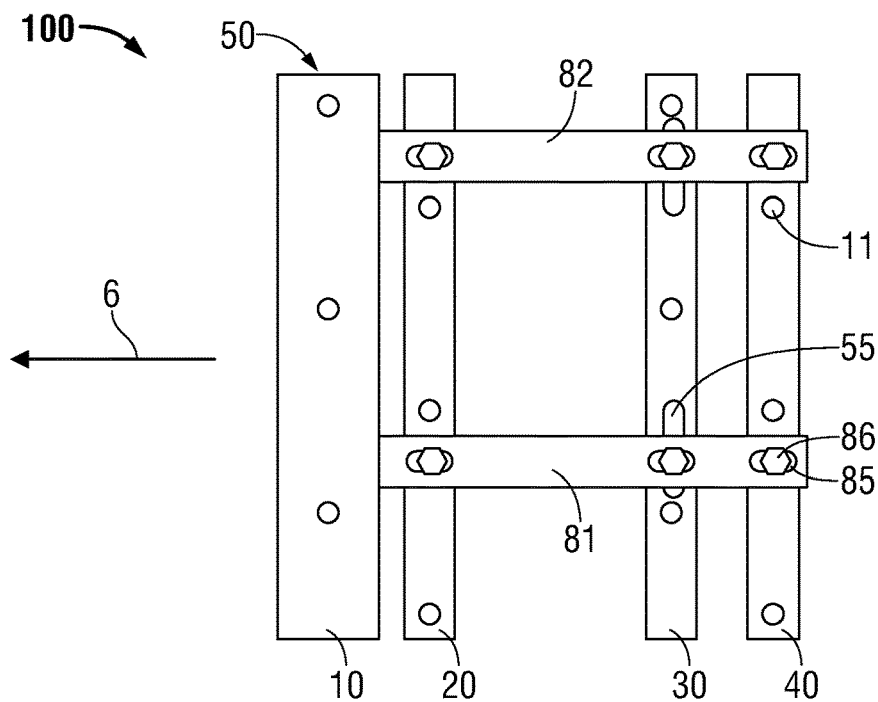
FIG. 3 depicts a top view of a portion of embodiment of the tine head assembly in accordance with the present disclosure, excluding portions of the tine head assembly for clarity.

FIG. 2 depicts an embodiment of the tine attachment assembly (50) having a support frame (70) comprising three generally parallel support arms (71, 72, 73) attached to the first holding member (10). The Figure further depicts the frame assembly (70) comprising a single cross arm (74) connecting the support arms (71, 72, 73) to provide the frame (70) with additional structural support to the support arms (71, 72, 73) during soil aeration operations. The support arms (71, 72, 73) are also shown comprising a plurality of slots (75) extending along the longitudinal axis of each support arm (71, 72, 73), allowing connection bolts (76) to move therein, thereby allowing the horizontal position of the secondary holding members (20, 30, 40) to be adjusted along the support arms (71, 72, 73), before tightening the bolts to secure the secondary bars to the support arms. Although each depicted slot (75) comprises a relatively short configuration, in an another embodiment (not shown) of the tine head (100), each slot (75) can be longer, ranging from one to ten inches, or being as long as each support arm (71, 72, 73). The embodiment of the tine head (100), depicted in FIG. 2, shows a plurality of vertical holes (51) extending through the secondary holding members (20, 30, 40) usable to receive tines (11) therein. Each tine (11) can be retained within each hole (51) by a bolt (56) being threadably engaged within a hole (57), which extends laterally through each secondary holding member (20, 30, 40) and intersects each vertical hole (51). Each bolt (56) can be tightened against the side of each tine (11) to retain the tine (11) in the vertical hole (11). As depicted in FIG. 3, the first holding member (10) can comprise vertical bores (52, see FIG. 3) for receiving tines (11), wherein the tines (11) can be similarly retained by lateral bolts (53) extending through lateral holes (54). Although threadable bolts (53, 56) are shown as the means to lock the tines (11) within the bores (51, 52), tines can be connected to the tine holding members (10, 20, 30, 40) by any other means known in the art.

In another embodiment (not shown) of the tine head, the support arms (71, 72, 73) and/or the cross arm (74) can also comprise a ruler (not shown), a line gauge, or calibrated lines along the length thereof to assist the operator in measuring the distances between secondary holding members (20, 30, 40) relative to the each other or relative to the first holding member (10) to assist in setting specific distances between the tines (11).

Referring now to FIG. 3, depicting a top view of a portion of an embodiment of the tine head assembly (100) in accordance with the present disclosure. Specifically, FIG. 3 depicts an embodiment of a tine attachment assembly (50) comprising tine holding members (10, 20, 30, 40) having the same configuration as depicted in FIG. 2. The tine attachment assembly (50), as further shown, can comprise two generally parallel support arms (81, 82) attached to and extending from the first holding member (10). Similarly to the support arms (71, 72, 73) shown in FIG. 2, the support arms (81, 82) can comprise slots (85) along the longitudinal axis thereof, allowing the secondary holding members (20, 30, 40) to be connected to the support arms (81, 82) by bolts (86). The slots (85) also allow the position of the secondary holding members (20, 30, 40) to be adjusted along the support arms (81, 82), thereby adjusting the position and the separation of the tines (11), which are attached to the secondary holding members (20, 30, 40). As further depicted in FIG. 3, the secondary holding members (20, 30, 40) can comprise slots (55) along the longitudinal axis of the third holding member (30) or any other holding member (10, 20, 40), thereby being oriented generally perpendicular to the slots (85) along the support arms (81, 82). The slots (55 and 85) allow the second holding member (30) movement along two axes relative to the other holding members (10, 20, 40), wherein bolts (86) can be used to lock the second holding member (30) to the support arms (81, 82). In another embodiment (not shown) of the tine attachment assembly (50), the support arms (81, 82) can comprise slots that are generally perpendicular to the slots (85), enabling each secondary holding member (20, 30, 40) to have movement along two axes with respect to the any other holding member (10, 20, 30, 40).

Although embodiments depicted in FIGS. 2 and 3 depict the tine head (100) having a specific configurations, in alternate embodiments (not shown), the tine attachment assemblies (50) can comprise any number of parallel tine holding members. The frame (70) can also take the form of a single rectangular bar, instead of individual arms (71, 72, 73, 74), wherein the single bar can comprise a plurality of longitudinal or lateral slots adapted for connecting and locking the tine holding members (20, 30, 40). In another embodiment (not shown) of the tine attachment assembly (50), the first tine holding member (10) may support multiple rows of tines (11). In such embodiment, the first tine holding member (10) may be longer and/or wider than depicted in FIGS. 2 and 3, and may comprise a plurality of holes adapted for retaining multiple rows of tines therein and or a plurality of slots for adjusting the position of the tines, as described above. In yet another embodiment (not shown) of the tine head (100), the support frame (70) can comprise a single plate or can be attached directly to the support arm (60) and/or to the lateral mounting bar (65).

The tine head (100), depicted in FIGS. 2 and 3 or any variation described above, can be used on several soil aerators (not shown), allowing such soil aerators to be used as straight deep spike aerators. Specifically, the tine head (100) can include a plurality of conventional short length tines (11) or a combination of both long (i.e., deep) tines (not shown) and conventional short tines (11). In an embodiment of the tine head (100), the deep tines can be placed in the first tine holding member (10) and the conventional tines (11) can be placed in the secondary tine holding members (20, 30, 40). Therefore, the soil aerator (100) can perform both shallow and deep soil aeration simultaneously.

As depicted in FIGS. 2 and 3, the horizontal position of each secondary holding member (20, 30, 40) can be adjusted in relation to each other and to the first holding member (10) to form a desired tine (11) strike pattern as the tine head (100) is cycled during soil aeration operations. Sufficient separation between the tines (11) is important in order to maintain optimal aerating operations. As depicted in the embodiments of the tine head (100), shown in FIG. 3, the tines (11) can be distributed between the first holding member (10) and the secondary holding members (20, 30, 40) so that no two tines (11) will be closer to each other than 2.80 inches, while the reciprocating tine head (100) can form a tine hole pattern having two inches of space between each hole. Other tine hole patterns can also be achieved, for example, tine head patterns can have square patterns having two to four inches between tine holes or rectangular patterns having a length between one half to two inches and a width between one half and two inches.

FIGS. 4A-4D depict a tine strike pattern formed by the tine head (100) shown in FIG. 3 as the soil aerator (200) reciprocates the tines (11) vertically into and out of the soil (5), while moving in a forward direction (6) along the surface of the turf. As depicted in FIG. 4A-4D, strike locations from tines (11) located on the first holding member (10) are depicted by the numeral 1, strike locations (i.e., holes) from tines located on the second holding member (20) are depicted by the numeral 2, strike locations from tines located on the third holding member (30) are depicted by the numeral 3, and strike locations from tines located on the fourth holding member (40) are depicted by the numeral 4. The tine attachment assembly depicted in FIG. 3 is adapted to penetrate the turf every four inches, wherein during each subsequent stroke of the tine head (100), the tines (11) perforate the soil (5) between the holes created by the previous stroke of the tine head (100). This results in a final strike pattern, depicted in FIG. 4D, having holes that are closely spaced (e.g., two inches apart), without having tines (11) that are too closely spaced on the tine head (100). As previously stated, this is an advantage, as closely spaced tines (11) entering and exiting the soil (5) at the same time can disrupt or lift sections of the turf upon entry and/or exit. Because of this lesser tendency of the tines to disrupt or lift sections of turf during aerating operations, the soil aerator (100) may not require the use of a turf hold down guards (not shown) to be used during soil aeration operations to prevent disruption of the turf.

For example, when the soil aerator (200) is synchronized to strike the soil (5) for every four inches traveled (e.g., forward spacing of four inches), the tines (11) can be arranged in a configuration that can result in a two inch overall pattern, while the tines (11) are positioned farther apart on the tine head (100). FIG. 3 depicts tines (11) spaced four inches apart on the first holding member (10) to form a four by four square pattern during aeration operations. FIG. 3 further depicts the second holding member (20) located such that the tines (11) thereof are two inches away from the tines (11) of the first holding member (10) and comprising three tines (11) spaced four inches apart, wherein the tines (11) are located between (i.e., being offset or disarranged from) the tines (11) on the first holing member (10) to form a zigzag pattern. The third holding member (30) is shown located such that the tines (11) thereof are four inches from the tines (11) of the second holing member (20) and comprising three tines (11) that are in alignment with the tines (11) of the first holding member (10), but between the tines (11) of the second holding member (20). Lastly, the fourth holing member (40) is shown positioned such that the tines (11) thereof are two inches from the tines (11) of the third holding member (30) and comprises three tines (11) that are in alignment with the tines (11) of the second holding member, but positioned between the tines (11) of the first and third holding members (10, 30). The arrangement of the tines (11) described above can result in a two inch square hole pattern while the tines only make contact with the soil (5) every four inches, thus more turf area can be treated in a shorter period of time as the soil aerator (200) can move along the soil (5) surface at a faster speed.

Figure 4A:
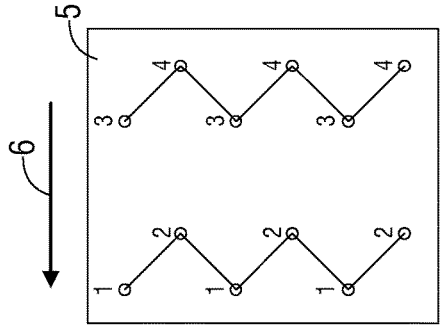
FIG. 4A depicts a top view of a portion of a strike pattern formed by an embodiment of the tine head assembly during soil aerating operations in accordance with the present disclosure.
Figure 4B:
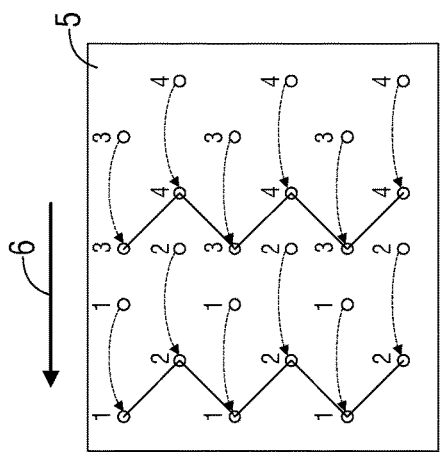
FIG. 4B depicts a top view of a portion of a strike pattern formed by an embodiment of the tine head assembly during soil aerating operations in accordance with the present disclosure.
Figure 4C:
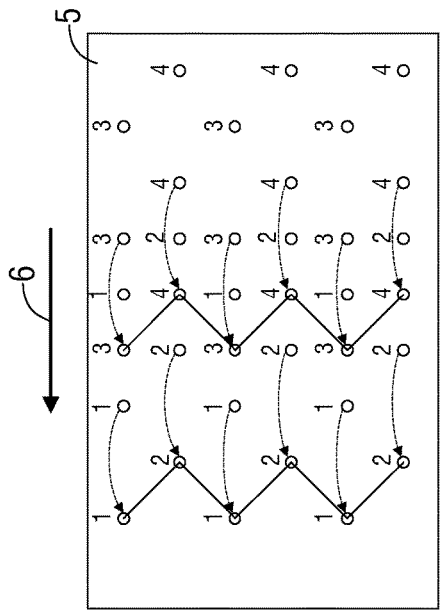
FIG. 4C depicts a top view of a portion of a strike pattern formed by an embodiment of the tine head assembly during soil aerating operations in accordance with the present disclosure.
Figure 4D:
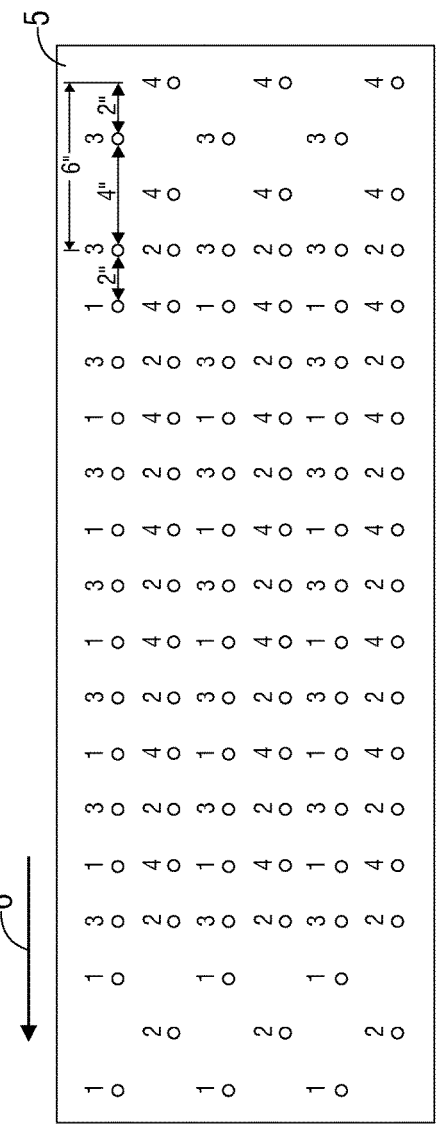
FIG. 4D depicts a top view of a portion of a strike pattern formed by an embodiment of the tine head assembly during soil aerating operations in accordance with the present disclosure.

When cycling the tine head (100) depicted in FIG. 3, it takes three strokes of the tine head (100), as the soil aerator (200) moves forward (6), for the third and fourth tine holding members (30, 40) to stamp holes between the holes created by the first and second holding members (10, 20) and start forming the desired two inch by two inch square pattern depicted in FIG. 4D. A tine head (100) comprising multiple rows of tines (11) and the steps of inserting trailing tines (11) (e.g., tines on the third and fourth holding members (30, 40)) between holes created by the leading tines (11) (e.g., tines on the first and second holding members (10, 20)) as the soil aerator moves forward (6) can speed up the rate of soil aeration operations and preserve the integrity of the turf.

FIGS. 4A-4C depict the steps of forming the hole pattern depicted in FIG. 4D using the tine head (100) depicted in FIGS. 2 and 3. FIG. 4A depicts the hole pattern created as the tine head (100) is inserted into the soil (5) for the first time. Holes created by tines (11) connected to the first holding member (10) form a row of holes indicated by numeral 1, holes created by tines (11) connected to the second holding member (20) form a row of holes indicated by numeral 2, holes created by tines (11) connected to the third holding member (30) form a row of holes indicated by numeral 3, and holes created by tines (11) connected to the fourth holding member (40) form a row of holes indicated by numeral 4. FIG. 4B depicts the hole pattern created as the tine head (100) is inserted into the soil (5) for the second time, with the arrows indicating the movement of the tines (11) between the first and the second strike. FIG. 4C depicts the hole pattern created as the tine head (100) is inserted into the soil (5) for the third time, with the arrows indicating the movement of the tines (11) between the second and the third strikes. 4D depicts the final hole pattern created by the soil aerator (200) after the tine head (100) is inserted into the soil (5) for the third time. FIGS. 4A-4C depict the rows of holes created by the tines of the first and second holding members (10, 20) forming a zigzag pattern and the rows of holes created by the tines of the third and fourth holding members (30, 40) forming a zigzag pattern.

Although the specific strike pattern depicted in FIG. 4D is a result of the tine (11) configuration depicted in FIGS. 2 and 3, other tine strike patterns (not shown), for example, having smaller or greater spacing between tines (11), can be accomplished by changing the tine locations on the tine head (100). This can be done, for example, by moving the positions of the holding members (10, 20, 30, 40) along the frame assembly (70). In another embodiment (not shown), the tines (11) may have larger or smaller spacing therebetween, along the length of each holding members (10, 20, 30, 40). The length of each holding member (10, 20, 30, 40) and/or the number of tines (11) on each holding member (10, 20, 30,40) may be increased or decreased. For example, each holding member (10, 20, 30, 40) may be twice as long as depicted in FIGS. 2 and 3, and/or contain two to eight tines (11) attached thereto. The secondary holding members (20, 30, 40) may also be moved closer or further out from the first holding member (10) and/or relative to each other. Also, in another embodiment (not shown) of the tine head (100), a larger or a smaller number of secondary holding members (20, 30, 40) may be incorporated. For example, a tine head (100) may contain one to six secondary holding members attached thereto. In a further embodiment of the tine head (100), the first holding member (10) may be omitted, wherein the tine head (100) only contains movable secondary holding members (20,30,40).

In another embodiment (not shown) of the tine head (100) and method of aerating soil, the tine head (100) can comprise only the first and second tine holding members (10, 20) and/or move shorter distances between each stroke of the tine head (100), wherein the holes made by the tines (11) of the second holding member (20) are positioned between the holes made by tines (11) of the first holding member during the previous stroke of the tine head (100). In another embodiment the holes made by the second tine holding member (20) can be formed between and in line with the holes made by the tines (11) of the first holding member during the previous stroke of the tine head (100).

Prior art tine heads containing two or more rows of tines, which are generally referred to as "cluster blocks," and designed to be stamped or inserted into the soil in sequence, adjacent to (e.g., in front of) the previous set of holes created during the previous cycle of the tine head. Because soil aerators do not cycle these cluster blocks in an overlapping manner, the prior art tine heads require closely spaced tines to form a closely spaced hole pattern in the turf. As previously explained, tine heads having too many tines within a small amount of space and can break off and/or lift sections of the turf upon entry and/or exit.

It should be understood by persons of ordinary skill in the art that an embodiment of the soil aerator (200) and the tine head (100) in accordance with the present disclosure can comprise all of the improvements/features described above. However, it should also be understood that each improvement/feature described above can be incorporated into the soil aerator (200) and the tine head (100) by itself or in combinations, without departing from the scope of the present disclosure.

What is claimed is:

1. A tine attachment assembly for retaining soil aerating tines during soil aerating operations comprising:
   a support frame; and
   a plurality of tine holding members connected to the support frame, at least one tine holding member adjustably connected to the support frame such that the position on the support frame of the at least one tine holding member can be adjusted with respect to a position of at least one other tine holding member on the support frame, wherein each tine holding member comprises a plurality of tine connectors disposed in at least one row along a length thereof, wherein each tine connector is structured and operable to connect a soil aerating tine to the respective tine holding member.

2. The tine attachment assembly of claim 1, wherein the tine holding members are connected to the support frame such that at least one space between rows of tine connectors is wider than at least one other space between rows of tine connectors.

3. The tine attachment assembly of claim 1, wherein the tine holding members are connected to the support frame such that the tine connectors of at least one tine holding member are positioned between the tine connectors of at least one other tine holding member.

4. The tine attachment assembly of claim 1, wherein the tine holding members are connected to the support frame such that respective tine connectors of at least one tine holding member are positioned between respective tine connectors of at least one subsequent tine holding member.

5. The tine attachment assembly of claim 1 further comprising tines connected to at least one tine holding member via respective tine connectors.

6. The tine attachment assembly of claim 5, wherein the tines are connected to the plurality of tine holding members and the tine holding members are connected to the support frame such that the tines are configured in a zigzag pattern.

7. The tine attachment assembly of claim 5, wherein at least one tine has a length that different than the length of at least one other tine.

8. A tine head assembly for retaining soil aerating tines during soil aerating operations comprising:
   a support arm and mounting bar assembly adapted for connection to a soil aerating device; and
   a tine attachment assembly connected to the support arm and mounting bar assembly, the tine attachment assembly comprising:
      a support frame; and
      a plurality of tine holding members connected to the support frame, at least one tine holding member adjustably connected to the support frame such that a position on the support frame of the at least one tine holding member can be adjusted with respect to a position of at least one other tine holding member on the support frame, wherein each tine holding member comprises a plurality of tine connectors forming a row of tine connectors along a length of each respective tine holding member.

9. The tine head assembly of claim 8, wherein the tine holding members are connected to the support frame such that at least one space between rows of tine connectors is wider than at least one other space between rows of tine connectors.

10. The tine head assembly of claim 8 comprises four tine holding members connected to the support frame having three spaces separating the rows of tine connectors of adjacent tine holding members, wherein a central space of the three spaces is wider than at least one other of the three spaces.

11. The tine head assembly of claim 8, wherein the tine holding members are connected to the support frame such that the tine connectors of at least one tine holding member are positioned between the tine connectors of at least one other tine holding member.

12. The tine head assembly of claim 8, where at least one tine holding member is adjustably connected to the support frame such that the position of the respective tine holding member on the support frame can be adjusted along two axes relative to at least one other tine holding member.

13. The tine head assembly of claim 8 further comprising tines connected to each tine holding member via respective tine connectors, wherein the tines are connected to the tine holding members and the tine holding members are connected to the support frame such that the tines are configured in a zigzag pattern.

14. The tine head assembly of claim 8 further comprising tines connected to each tine holding member via respective tine connectors, wherein at least one tine has a length that different than the length of at least one other tine.

* * * * *